(12) United States Patent
Kalev

(10) Patent No.: US 6,275,703 B1
(45) Date of Patent: Aug. 14, 2001

(54) CONTROLLING HANDOVER IN A MOBILE COMMUNICATION NETWORK

(75) Inventor: Jordan Kalev, Irving, TX (US)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/319,194

(22) PCT Filed: Dec. 4, 1996

(86) PCT No.: PCT/EP96/05413

§ 371 Date: Aug. 5, 1999

§ 102(e) Date: Aug. 5, 1999

(87) PCT Pub. No.: WO98/25429

PCT Pub. Date: Jun. 11, 1998

(51) Int. Cl.[7] ........................................... H04Q 7/20
(52) U.S. Cl. ........................ 455/436; 455/439; 455/442
(58) Field of Search ................................. 455/436, 437, 455/438, 439, 440, 441, 442, 443, 444; 370/331, 332

(56) References Cited

U.S. PATENT DOCUMENTS

| | | |
|---|---|---|
| 5,499,387 | 3/1996 | Chambert . |
| 5,509,051 | 4/1996 | Barnett et al. . |
| 5,740,535 * | 4/1998 | Rune ..................................... 455/437 |
| 5,854,981 * | 12/1998 | Wallstedt et al. ..................... 455/439 |
| 5,991,626 * | 11/1999 | Hinz et al. ............................ 455/436 |
| 6,021,328 * | 2/2000 | Curtis et al. .......................... 455/436 |
| 6,115,608 * | 9/2000 | Duran et al. .......................... 455/436 |
| 6,119,005 * | 9/2000 | Smolik .................................. 455/436 |

FOREIGN PATENT DOCUMENTS

| | | |
|---|---|---|
| 666 699 | 8/1995 | (EP) . |
| 727 915 | 8/1996 | (EP) . |
| WO 93/15569 | 8/1993 | (WO) . |
| WO 93/26100 | 12/1993 | (WO) . |
| WO 95/28808 | 10/1995 | (WO) . |

* cited by examiner

Primary Examiner—Dwayne Bost
Assistant Examiner—Sonny Trinh
(74) Attorney, Agent, or Firm—Merchant & Gould P.C.

(57) ABSTRACT

A method and system of controlling handover in a mobile communication network is described. According to the described technique, the selection of one of a plurality of handover alternatives is based on pre-stored probability indicators which indicate a likely probability of success if handover is effected to that handover alternative. The technique also involves the use of a monitoring period which monitors both the instant and the selected traffic channel for a period surroundding handover to provide data for subsequent use in selecting handover alternatives.

12 Claims, 2 Drawing Sheets

CONTROLLING HANDOVER IN A MOBILE COMMUNICATION NETWORK

This invention relates to a method and system of controlling handover in a mobile communication network.

In a mobile communication network, each mobile station in dedicated mode communicates with a base station via a traffic channel which is determined depending on the environment within which the mobile station is located, the signal levels between the mobile station and the base station, interference of the signal transmitted between the mobile station and the base station and other factors which affect the signals which are transmitted between the mobile station and the base station in handling a call. The term traffic channel is used herein to denote a channel set up for communication of signals between a mobile station and a base station. In a standard GSM TDMA system, a traffic channel is defined by a particular frequency for signal transmission and a particular time slot allocation or in case of frequency hopping by a hopping sequence. In some, more sophisticated, systems it may alternatively or additionally be defined by the radiation direction of a signal as in so-called SDMA systems.

In the following discussion of handover techniques it will be appreciated that it is generally the frequency of a traffic channel which is under discussion or in case of frequency hopping the set of frequencies allocated to the mobile station called mobile allocation. That is, the terms frequency, frequency channel or channel are used to denote a frequency used to carry traffic.

There are several reasons why a traffic channel may need to be altered during the progress of a call. As the mobile station moves, its relationship in signalling terms with the base station is constantly being altered and with it the signal parameters of the communication between the mobile station and the base station alter. According to the existing handover techniques, one or more of these signal parameters is monitored to detect a trigger condition for handover and, when that trigger condition is detected, handover is implemented to another traffic channel. These signal parameters can include the following:

i) the quality of the signal on the up-link or down-link, ii) the level of the signal on the up-link or down-link, iii) timing advance information (which is a measure of how far away the mobile station is from the base station with which it is presently communicating), iv) traffic levels in the area, and v) power budget considerations.

The traffic channel for handover is selected by virtue of various different handover algorithms which are dependent on the communication environment. If after the handover the quality of the call is improved, the handover decision is good. However, there are many situations where the handover decision is bad, and the call is either dropped or the quality deteriorates. The major reason for this is that the handover decision is based only on signal level information from the handover candidates.

It is thus an object of the present invention to improve the success of handover decisions so that a larger majority of calls maintain good quality after being handed over.

According to one aspect of the present invention there is provided a method of controlling handover in a mobile communication network wherein an instant traffic channel providing communication between a mobile station and a base station is monitored to detect a trigger condition for handover to a different traffic channel, the different traffic channel being selected from a plurality of handover alternatives, the selection of one of said plurality of handover alternatives as said different traffic channel being based on prestored probability indicators associated respectively with each handover alternative, each probability indicator indicating a likely probability of success if handover is effected to that handover alternative.

By storing probability indicators with each handover alternative, it is possible to effect a handover decision which uses the handover alternative having the highest probability of success in that particular environment.

In the described embodiment, such a plurality of handover alternatives and associated probability indicators are stored for each of a set of cell patterns, each cell pattern comprising a group of neighbouring cells in the network. These cell patterns are referred to herein as server patterns and can comprise a group of up to four cells including the server cell and the three neighbouring cells having the best reported signal levels. The handover alternatives and associated probability indicators are referred to herein as a server pattern probability vector (SPPV). In the preferred embodiment therefore there is a server pattern probability vector associated with each server pattern.

According to another aspect of the present invention there is provided a method of effecting handover in a mobile communication network comprising the steps of:

monitoring a first traffic channel providing communication between a mobile station and a base station to detect a trigger condition for handover;

after said trigger condition has been detected, selecting from a plurality of handover alternatives a second traffic channel to provide said communication, and effecting handover to said second traffic channel;

during a monitoring period commencing at detection of the trigger condition, monitoring the first and second traffic channels and the remaining handover alternatives; and storing channel data collected during the monitoring period for use in subsequent handovers.

The feature of this aspect of the invention can be combined with the feature of the first aspect of the invention by using the channel data collected during the monitoring period on the instant traffic channel and the remaining handover alternatives to determine and update the probability indicators.

The monitoring period can commence at a registration point at which the trigger condition is detected. It can terminate at an evaluation point where the success or failure of the selected traffic channel is decided, the success or failure being taken into account to determine and update the probability indicator.

This aspect of the invention also provides a system for effecting handover in a mobile communication network, the system comprising:

means for monitoring a first traffic channel providing communication between a mobile station and a base station to detect a trigger condition for handover;

means for selecting from a plurality of handover alternatives a second traffic channel to provide said communication after said trigger communication has been detected;

switching means for effecting handover from the first traffic channel to the second traffic channel;

means for monitoring the first and second traffic channels and the remaining handover alternatives during a monitoring period commencing at detection of the trigger condition; and a store holding channel data collected during the monitoring period for use in subsequent handovers.

According to another aspect of the present invention there is provided a system for controlling handover in a mobile communication network, the system comprising:

means for monitoring an instant traffic channel providing communication between a mobile station and a base station to detect a trigger condition for handover to a different traffic channel;

means for selecting the different traffic channel from a plurality of handover alternatives;

a store holding said plurality of handover alternatives associated respectively with prestored probability indicators, each probability indicator indicating a likely probability of success if handover is effected to that handover alternative, wherein the selecting means selects said different traffic channel based on said probability indicators.

In accordance with a further aspect of the present invention there is provided a mobile communication network comprising a plurality of base stations for defining cells in the network and at least one base station controller for controlling said base stations, the base station controller including a system for controlling handover, the system comprising:

means for monitoring an instant traffic channel providing communication between a mobile station and a base station to detect a trigger condition for handover to a different traffic channel;

means for selecting the different traffic channel from a plurality of handover alternatives;

a store holding said plurality of handover alternatives associated respectively with prestored probability indicators, each probability indicator indicating a likely probability of success if handover is effected to that handover alternative, wherein the selecting means selects a different traffic channel based on said probability indicators.

For a better understanding of the present invention and to show how the same may be carried into effect, reference will now be made by way of example to the accompanying drawings in which.

Figure 1:
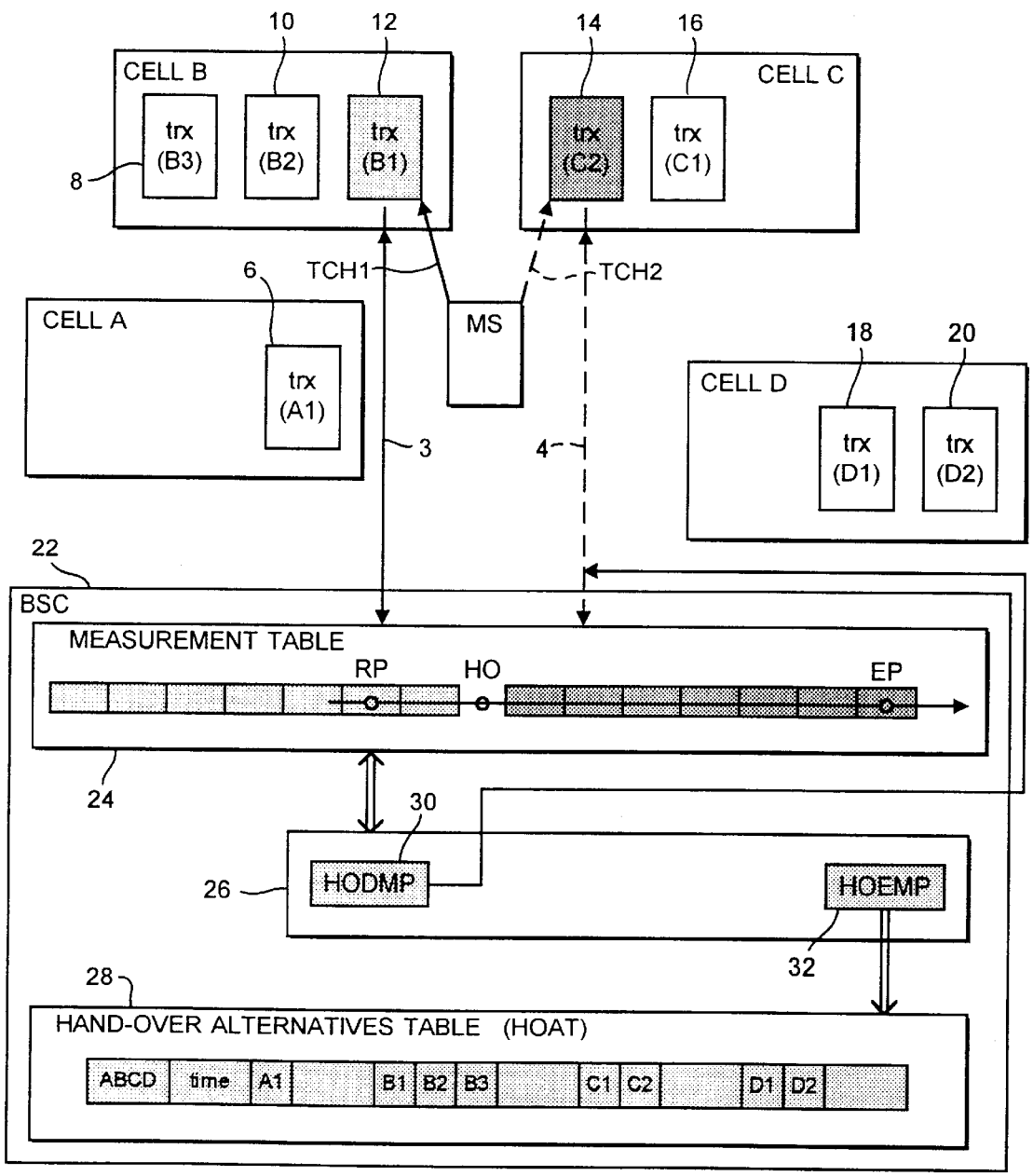
FIG. 1 is a block diagram of a system for controlling handover in a mobile communication network.

FIG. 1 illustrates four cells of a cellular mobile communication network which are labelled A, B, C, D. Each of these cells belongs to a base station which can have several cells, but for simplicity in the present example each base station is assumed to have a single cell. Thus the symbols A, B, C, D can be used as reference to both cells and base stations. Each cell can contain one or more transceivers. In the illustrated example, cell A contains one transceiver 6, cell B contains three transceivers 8,10,12, cell C contains two transceivers 14,16, and cell D contains two transceivers 18,20.

Each of the cells A, B, C, D is related to a coverage area, which can be defined as an area where the mobile stations can maintain a connection (call) via the corresponding cell. In the present example it is assumed that the coverage areas of cells A, B, C, D are overlapping. It is therefore the area of overlapping where the mobile stations will report the server pattern ABCD. The actual serving cell and the order of the three neighbours is not important. For example server A and neighbours BCD, and server B and neighbours DAC, will be represented by the same server pattern ABCD.

FIG. 1 shows a single mobile station MS. In practice there will of course be several mobile stations within the network. The illustrated mobile station MS is active in dedicated mode and is presently communicating via the transceiver 12 of cell B along traffic channel TCH1. In the present embodiment, it is assumed that each transceiver provides a single frequency, which is referred to herein by the cell letter and the transceiver number. Ex explained earlier in the introductory part, each frequency can be considered to provide traffic channels on a cell by cell basis. In practice, according to the GSM standard each frequency will support up to eight (16 in case of half rate) time divided traffic channels. All traffic channels using the same frequency channel but different time slots usually provide similar quality connection and therefore are considered as equivalent handover alternatives. Thus in the illustrated example each of the frequencies B1, B2, B3 belonging to cell B represents several traffic channels and therefore several alternatives.

A base station controller (BSC) 22 controls the activity of several base stations and in the described embodiment controls the activity of the transceivers in cell A, B, C and D. Base station controller 22 includes circuitry for monitoring calls and effecting handover decisions. This circuitry includes a measurement table 24 which receives reports including measurement data from each active mobile station in dedicated mode. A control circuit 26 connected to the measurement table implements and monitors handover decisions. A handover alternative table (HOAT) 28 is connected to the control circuit 26 and is used by the control circuit 26 to select a handover alternative. The control circuit includes a microprocessor which is capable of running a handover decision making process (HODMP) 30 and a handover evaluation making process (HOEMP) 32 which will be described in more detail hereinafter. FIG. 1 shows diagrammatically that the outputs of the handover evaluation making process 32 is sent to the handover alternative table 28 and that the output of the handover decision making process is used to alter the traffic channel by which the mobile station communicates with the base station. In the example illustrated in FIG. 1, the mobile station is switched from traffic channel 1 TCH1 to traffic channel 2 TCH2 which is via the transceiver 14 of cell C, or frequency channel C2. Transceiver 12 of cell B communicates with the base station controller via an A-bis interface 3. The transceiver 14 of cell C however communicates with the base station controller via an alternative A-bis interface 4 which is denoted diagrammatically with dotted lines.

Figure 2:
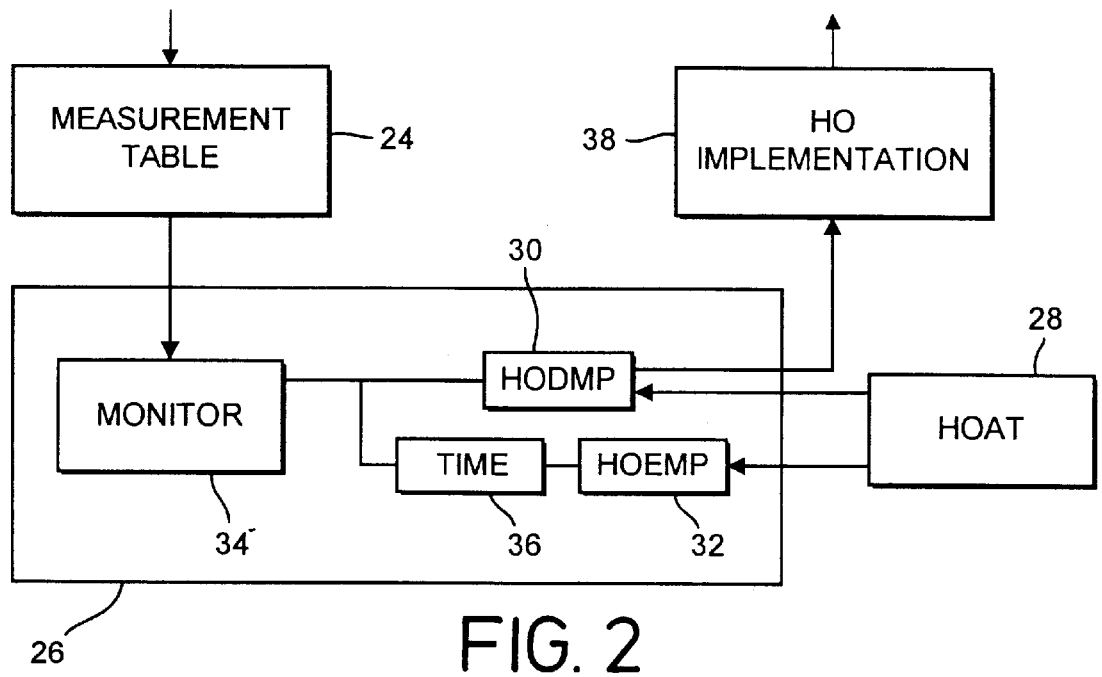
FIG. 2 is a block diagram showing in more detail the circuitry within the base station controller.

The circuitry within the base station controller 22 is shown in more detail in FIG. 2. Reference will be made to this figure to describe how a handover is implemented according to the described embodiment of the invention.

The base station controller 22 collects measurement data for each active call reported by the mobile station MS and the serving cell (cell B) in the measurement table 24. The mobile station MS reports to the serving cell B using the traffic channel TCH1, and then cell B sends a report to the base station controller using the A-bis interface 3. The report combines the measurements of both the mobile station and transceiver 12 at cell B. In the described embodiment, the reported data is according to the GSM standard and includes information such as down-link signal level, up-link signal level, up-link and down-link quality, signals levels of the six best neighbouring cells, etc. The base station controller keeps a selected number of reports, for example 32, which are used to follow these parameters. The control circuit 26 includes a monitoring circuit 34 which monitors these parameters and triggers a handover according to a handover algorithm utilising one or more of these parameters. Such handover algorithms are known operating with existing GSM systems, where the handover alternatives are ranked according to the measurement reports in the measurement table 24. However, according to the presently described novel system at the point at which a handover is triggered according to the existing handover algorithms, a registration point RP is established, as illustrated for example in FIGS. 1 and 3. At the registration point RP, the handover decision making process 30 is activated. This process 30 retrieves data from the handover alternatives table 28 and uses this data to select a traffic channel for the handover say TCH2. This traffic channel is then implemented using the handover implementation circuit 38 so that the mobile station subsequently uses the traffic channel TCH2 to communicate via transceiver 14 in cell C, and cell C uses the A-bis enterface 4 to communicate with the base station controller 22. The handover implementation is designated HO in FIGS. 1 and 3, but it is not described here since it is known in the art. A timer 36 sets a monitoring period which terminates at an evaluation point EP. The monitoring period is measured as a user determined number of reports received from the mobile station. At the evaluation point, the handover evaluation making process 32 is activated which evaluates the success or failure of the handover and modifies the data stored in the handover alternatives table 28 accordingly. Thus, the handover alternative table is updated each time a handover is implemented so that it provides a constantly changing reference point for subsequent handover decisions. This greatly increase the likelihood of success of making a successful handover decision.

Figure 3:
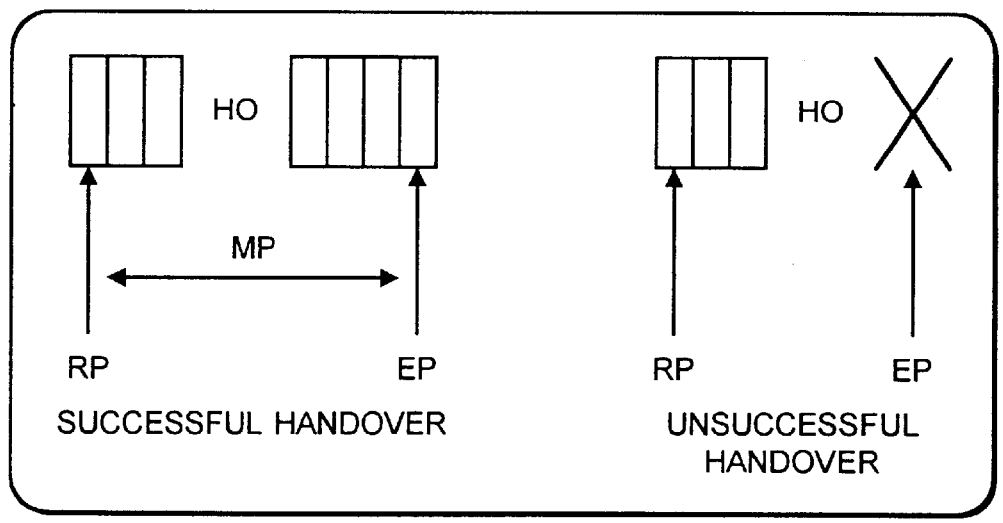
FIG. 3 is a timing diagram for handover and related monitoring period.

As illustrated in FIG. 3, if the cell is dropped after the handover HO has been implemented, the monitoring period ceases at that point and the failure of the handover decision is used to update the handover alternatives table 28 accordingly.

One example of a handover alternatives table is illustrated as Table I. A handover alternatives table holds for each of a number of server patterns a server pattern probability vector of SPPV. Each server pattern is a group of four cells which includes a serving cell and the three best neighbours reported by the mobile station at the registration point RP. In this example the HOAT contains 15000 entries for different SP and asociated SPPV. These server patterns are established and updated according to the reports received from the mobile stations in the area governed by the base station controller 22. The server pattern probability vector SPPV indicates for each of the frequency channel alternatives for that cell a probability indicator which indicates the likely probability of success if handover was made to any of the traffic channels supported by that frequency channel in that server pattern. In the examnple illustrated in Table I, it is assumed that there are 10 alternative frequency channels in each cell which are denoted by the letter denoting the cell and the number 1 to 10 accordingly. The probability indicators for these channels are denoted as follows P(cell letter-numeral). For example, the probability indicator for channel A1 in server pattern ABCD is P(A1). The server pattern probability vector for server pattern ABCE is shown shaded.

Each probability indicator takes a value in the range from minus 127 to 127 which is mapped to a successful handover probability as illustrated in Table II. The advantage of using a range from minus 127 to 127 is that the probability indicator can be represented as a single byte. The relevant probability indicators are updated at the evaluation point EP of each handover. This is done by aggregating values within particular ranges dependent on certain handover events. Table III illustrates one example of handover events and corresponding values.

The values in Table III should be regarded as credit points given to different handover alternatives for performance or performance estimate.

The terms good/bad level/quality used in Table III are related with some threshold value and measurements' averaging. Different definitions can be used, for example:

The level is good if the average over the reported samples during the monitoring period is greater or equal to a predefined threshold and bad otherwise.

The quality is good if a predefined percentage of the reported samples is greater or equal to a predefined threshold and bad otherwise.

Similar definitions are known and used in the existing handover algorithms, thus no more details will be given here.

The top half of Table III assumes that a successful handover decision was made from channel B1 to channel C2. Signal level and quality are monitored during the monitoring period and credit points allocated accordingly to the various frequency channels. Table III indicates the channels, the range of values and the value within the range which has been selected as credit to be added to the probability indicator.

For good signal quality and level on channel C2 during the monitoring period, the maximum value of 16 is allocated to the channel C2, but where there are good signal quality and levels on one channel of a particular cell, it is assumed that other channels in the same cell will also have reasonable signal quality and levels, and therefore a value of 4 is selected.

Where bad signal quality and level are detected on channel C2 during the monitoring period, a value of −4 is allotted to both channel C2 and to channel C1.

Where bad signal quality but good signal level is detected on channel C2 during the monitoring period, a value of −8 is alloted to channel C2, but a value of 4 is allotted to channel C1. That is, it is a reasonable assumption that the signal level will be similar for channels in a common cell, although the quality may be different.

If the call is dropped on channel C2 during the monitoring period (after successful handover), a value of −16 is allocated to the channel C2 and a value of −8 is allocated to the channel C1.

For good signal levels on the channels in adjacent cells B and D, a value of 4 is allocated. See for example in the tables channel D1, D2, B2 and B3. A value of 0 is allocated to channel B1 however because that is the channel from which handover is to be effected so even if there is good level on B1 it is assumed that some trigger condition has been defined causing a handover to be activited. Thus, a lower value is appropriate.

For bad signal levels on channels in adjacent cells, a value of −6 is allocated, see channels D1, D2, B1, B2 and B3 in Table III.

A similar process can be conducted for an unsuccessful handover from channel B1 to channel C2. For a call returned on channel B1 successfully, a low value of −16 is allocated to channel C2. Where good signal quality and levels are determined on channel B1 during the monitoring period, a value of 4 is allocated to all of the channels in that cell. For bad signal level and quality on channel B1 during the monitoring period, a low value of −4 is allocated to all channels within that cell. For a bad signal quality but good signal level on channel B1 during the monitoring period, a value of −8 is allocated to channel B1, but a higher value of 4 is allocated to the channels B2 and B3, once again indicative of the fact that the signal level is likely to be good on those channels but no predeterminations can be made about the quality.

If the call is dropped, both the channels B1 and C2 are allocated a low value of −16.

It will readily be apparent that any value allocation system could be used, and could in fact be left up to a user to define.

The probability indicator for each frequency channel within the server pattern ABCD is determined by adding to the value kept in the SPPV credit points according to the handover related events as shown in Table III. Assuming P(C2)=78 in the ABCD SPPV for example, after a successful handover to C2 and good quality and level reported on C2 the new value in the SPPV is P(C2)=78+16=94, however if the handover was unsuccessful and the call was dropped the new value is P(C2)=78+16=62. In case the sum is out of range, say less than minus 127 or greater than 127, the closest allowed value is used. In this way, the probability indicators are updated each time a handover decision is implemented so that the server pattern probability vector SPPV is altered for each server pattern. Thus, the server pattern probability vectors SPPV provide a useful tool for selecting a handover alternative. A simple criterion such as always using the alternative having the highest SPPV score, or any SPPV channel with a score better than a predetermined threshold could be used to replace or compliment existing selection criteria for the handover alternative.

The memory requirement will depend on the number of SPPV in the HOAT. The size of the HOAT in given BSC can be estimated as a function of the number of cells managed by the BSC and the average number of neighbours per cell. For example, a BSC with 100 cells each of them having an average of 16 neighbours will need 14000 entries in the HOAT. In case the reserved space is not enough and the HOAT is already full, the SPPV with the oldest time stamp, see Table I, can be dropped when new SP shows up.

There are several advantages to the handover technique described above.

No changes are needed to the GSM specifications in order to implement the technique. All that is required in additional circuitry at the base station controller to use the already existing reports which are sent via mobile stations.

The memory consumption and the computational efforts are moderate. As discussed earlier, the probability indicators can be stored as no more than 1 byte and very simple mathematical algorithms can be used to update and use the probability indicators.

The handover technique can be used either to compliment or to gradually replace the existing handover decision algorithms. Thus, it can be used alongside existing techniques to augment them without disturbing the existing handover decision algorithms.

TABLE I

| No. | Server Patterns (SP) | Last Update | Hand-Over Alternative (HOA) | | | | | | | | | | | |
|---|---|---|---|---|---|---|---|---|---|---|---|---|---|---|
| | | | 1 | ... | 10 | 1 | ... | 10 | 1 | ... | 10 | 1 | ... | 10 |
| 1 | ABCD | time | P(A1) | ... | P(A10) | P(B1) | ... | P(B10) | P(C1) | ... | P(C10) | P(D1) | ... | P(D10) |
| 2 | ABCE | time | P(A1) | ... | P(A10) | P(B1) | ... | P(B10) | P(C1) | ... | P(C10) | P(E1) | ... | P(E10) |
| ... | ... | time | ... | ... | ... | ... | ... | ... | ... | ... | ... | ... | ... | ... |
| 15000 | WXYZ | time | P(W1) | ... | P(W10) | P(X1) | ... | P(X10) | P(Y1) | ... | P(Y10) | P(Z1) | ... | P(Z10) |

Server Pattern Probability Vector (SPPV)

TABLE II

| Value | Prob (%) |
|---|---|
| −127 | 0 |
| 0 | 50 |
| 127 | 100 |

TABLE III

| Event | Channels | Range | Value |
|---|---|---|---|
| Successful HO B1->C2 | | | |
| good Qual and Lev on C2 during the MP | C2 | 8 ... 24 | 16 |
| | C1 | 0 ... 8 | 4 |
| bad Lev (and Qual) on C2 during MP | C1, C2 | −8 ... 0 | −4 |
| bad Qual and good Lev on C2 | C2 | −12 ... −4 | −8 |
| | C1 | 0 ... 8 | 4 |
| call dropped on C2 during MP | C2 | −24 ... −8 | −16 |
| | C1 | −12 ... −4 | −8 |
| good Lev on D during MP | D1, D2 | 0 ... 8 | 4 |
| good Lev on B during MP | B1 | −4 ... 4 | 0 |
| | B2, B3 | 0 ... 8 | 4 |
| bad Lev on D during MP | D1, D2 | −8 ... −4 | −6 |
| bad Lev on B during MP | B1, B2, B3 | −8 ... −4 | −6 |
| Unsuccessful HO B1->C2 | | | |
| call returned on B1 successfully | C2 | −24 ... −8 | −16 |
| good Qual and Lev on B1 during MP | B1, B2, B3 | 0 ... 8 | 4 |
| bad Lev (Qual) on B1 during MP | B1, B2, B3 | −8 ... 0 | −4 |
| bad Qual and good Lev on B1 during MP | B1 | −12 ... −4 | −8 |
| | B2, B3 | 0 ... 8 | 4 |
| call dropped | B1, C2 | −24 ... −8 | −16 |

What is claimed is:

1. A method of controlling handover in a mobile communication network wherein an instant traffic channel providing communication between a mobile station and a base station is monitored to detect a trigger condition for handover to a different traffic channel, the different traffic channel being selected from a plurality of handover alternatives, the selection of one of said plurality of handover alternatives as said different traffic channel being based on prestored probability indicators associated respectively with each handover alternative, each probability indicator indicating a likely probability of success if handover is effected to that handover alternative, wherein said probability indicators are updated based on data collected by monitoring traffic channels during each handover.

2. A method according to claim 1, wherein such a plurality of handover alternatives and associated probability indicators are stored for each of a set of cell patterns, each cell pattern comprising a group of neighbouring cells in the network.

3. A method according to claim 2, wherein the number of cells in each group is four.

4. A method according to claim 2, wherein the different traffic channel is selected from the plurality of handover alternatives stored with one of said cell patterns, said one cell pattern being selected by determining a group of cells including the serving cell and a number of neighbouring cells having the best reported signal levels from the mobile station when a trigger condition for handover is detected.

5. A method according to claim 1 wherein the trigger condition is detected at a registration point for effecting handover, and wherein a monitoring period commences at the registration point during which the instant traffic channel providing communication between the mobile station and the base station is monitored before and after handover is effected.

6. A method according to claim 5, wherein not only the instant traffic channel but the remaining handover alternatives of the said plurality of handover alternatives are monitored during the monitoring period.

7. A method according claim 5, wherein the monitoring period terminates at an evaluation point where the success or failure of the selected traffic channel is decided, the success or failure being taken into account to determine and update the probability indicator in respect of that handover.

8. A system for controlling handover in a mobile communication network, the system comprising:
means for monitoring an instant traffic channel providing communication between a mobile station and a base station to detect a trigger condition for handover to a different traffic channel;
means for selecting the different traffic channel from a plurality of handover alternatives;
a store holding said plurality of handover alternatives associated respectively with prestored probability indicators, each probability indicator indicating a likely probability of success if handover is effected to that handover alternative, wherein the selecting means selects said different traffic channel based on said probability indicators and wherein said monitoring means is operable to monitor the instant traffic channel providing communication between the mobile station and the base station during a monitoring period before and after handover is effected, the system further comprising means for updating the probability indicators based on data collected during the monitoring period.

9. A system according to claim 8, wherein said store holds such a plurality of handover alternatives and associated probability indicators for each of a set of cell patterns, each cell pattern comprising a group of neighbouring cells in the network.

10. A mobile communication network comprising a plurality of base stations for defining cells in the network and at least one base station controller for controlling said base stations, the base station controller including a system for controlling handover, the system comprising:
means for monitoring an instant traffic channel providing communication between a mobile station and a base station to detect a trigger condition for handover to a different traffic channel;
means for selecting the different traffic channel from a plurality of handover alternatives;
a store holding said plurality of handover alternatives associated respectively with prestored probability indicators, each probability indicator indicating a likely probability of success if handover is effected to that handover alternative, wherein the selecting means selects a different traffic channel based on said probability indicators.

11. A method of effecting handover in a mobile communication network comprising the steps of:
monitoring a first traffic channel providing communication between a mobile station and a base station to detect a trigger condition for handover;
after said trigger condition has been detected, selecting from a plurality of handover alternatives a second traffic channel to provide said communication, and effecting handover to said second traffic channel;
during a monitoring period commencing at detection of the trigger condition, monitoring the first and second traffic channels and the remaining handover alternatives; and
storing channel data collected during the monitoring period for use in subsequent handovers.

12. A system for effecting handover in a mobile communication network, the system comprising:
means for monitoring a first traffic channel providing communication between a mobile station and a base station to detect a trigger condition for handover;
means for selecting from a plurality of handover alternatives a second traffic channel to provide said communication after said trigger communication has been detected;
switching means for effecting handover from the first traffic channel to the second traffic channel;
means for monitoring the first and second traffic channels and the remaining handover alternatives during a monitoring period commencing at detection of the trigger condition; and
a store holding channel data collected during the monitoring period for use in subsequent handovers.

* * * * *